United States Patent [19]

Seen et al.

[11] Patent Number: 4,746,982

[45] Date of Patent: May 24, 1988

[54] EQUIPMENT FOR THROUGH-CONNECTING COLOR TELEVISION SIGNALS

[75] Inventors: Manfred Seen, Weilheim; Hans Schneider, Munich, both of Fed. Rep. of Germany

[73] Assignee: Siemens Aktiengesellschaft, Berlin and Munich, Fed. Rep. of Germany

[21] Appl. No.: 37,390

[22] Filed: Apr. 8, 1987

[30] Foreign Application Priority Data

Apr. 11, 1986 [DE] Fed. Rep. of Germany ....... 3612276

[51] Int. Cl.$^4$ ............................................. H04N 5/268
[52] U.S. Cl. ..................................................... 358/181
[58] Field of Search ................... 358/181, 22, 185, 86, 358/93

[56] References Cited

U.S. PATENT DOCUMENTS

| 4,218,709 | 8/1980 | Baxter et al. | 358/181 |
| 4,456,928 | 6/1984 | Guillon | 358/181 |
| 4,647,973 | 3/1987 | Deiss | 358/181 |

FOREIGN PATENT DOCUMENTS

| 0024618 | 11/1981 | European Pat. Off. . |
| 0063639 | 3/1982 | European Pat. Off. . |
| 0130036 | 2/1985 | European Pat. Off. . |
| 3303011 | 9/1984 | Fed. Rep. of Germany . |
| 8400115 | 1/1984 | Netherlands . |

OTHER PUBLICATIONS

Japanese Patent 55 1111750, vol. 5, No. 181, (3–83 (853), Nov. 20, 1981, Publication of Video Handbuch, Ru van Wezel.
1982, SID International Symposium Digest of Technical Papers.
ICC'84, Links for the Future, IEEE International Conference on Communications, May 14–17, 1984.

Primary Examiner—Tommy P. Chin
Attorney, Agent, or Firm—Hill, Van Santen, Steadman & Simpson

[57] ABSTRACT

Equipment for the through-connection of color television signals between a broadband network BN and video sources and video using equipment including a first video bus VB1 to which a plurality of source connection assemblies QAB1 through QAB3 can be connected with switching sets S1 throgh S3 is provided. A second video bus VB2 to which a plurality of using equipment connection assemblies SAB1 through SAB2 are connected and including a switch-over assembly UB which has input lines $L_E$ and output lines $L_A$ which are connected to the broadband network BN and are connectible to the video buses through interface switch sets SS1, SS2 and comprising a first interface switch set SS1 which is connected between the input lines and the second video bus and also including a second interface switch SS2 which is connected between the first video bus and the output lines and also including a third interface switch SS3 which is connected between the first video bus VB1 and the second video bus VB2 such that any source of television signals can be connected to any user equipment or sync of television equipments.

8 Claims, 4 Drawing Sheets

EQUIPMENT FOR THROUGH-CONNECTING COLOR TELEVISION SIGNALS

BACKGROUND OF THE INVENTION

1. Field of the Invention

The invention relates in general to equipment for interconnecting color television signals between a broadband network BN and video sources VQ and video using equipment VK which are connected thereto and in particular to an improved switching system for video signals.

2. Description of the Prior Art

Various video sources and various video user equipment or sinks must be connected to a broadband network. The video sources should also be interconnectible with a video using equipment or sinks of a user. In this application, video sources may, for example, be sources of video signals such as a video camera, a video recorder, a television tuner or a video disk playback unit. In this application, television using equipment or video sinks comprise television receivers, monitors, video recorders or video hard copying machines which are examples of video sinks. It is desired that all video sources are capable of being connected to all video sinks and, of course, also being connectible to the broadband network and for this requirement it is necessary to employ uniformly coded color television signals. For qualitative reasons, only a television signal divided into components need be considered. It has previously been known to through-connect the components of a video signal between video sources and video sinks and to the broadband network using a switching matrix network comprising a plurality of switching levels. High qualitative demands are made of the switching matrix network so as to satisfactorily solve the cross-talk problem. A simple CMOS switch is thus not satisfactory for a cross-point. The "Video-Handbuch" by Ru van Wezel, FranzisVerlag Munich 1977 discloses a cross-point of a cross-bar distributor on page 124. A correspondingly constructed switching matrix network would require a large monetary outlay due to the large number of levels required.

SUMMARY OF THE INVENTION

It is an object of the present invention to provide an equipment for through-connection of color television signals with a small circuit outlay.

It is a feature of this invention to provide equipment for through-connection of color television signals between a broadband network BN and video sources VQ and video sinks VK which are connected to the broadband network wherein a first video bus VB1 is provided and a plurality of source interconnecting assemblies QAB1 through QAB3 are connected to the first video bus through a switch set S1 through S3 and a second video bus VB2 is provided and a plurality of sink connection assemblies SAB1 through SAB3 are connected to the second video bus and a switch-over assembly UB is provided with input lines $L_E$ and output lines $L_A$ which are connected to the broadband network BN and are connectible to the video busses VB1 and VB2 by way of interface switch sets SS1, SS2 and SS3 and that a first interface switch set SS1 is connected between the input lines $L_E$ and the second video bus VB2 and a second interface switch set SS2 is connected between the first video bus VB1 and the output lines and a third interface switch set SS3 is connected between the first video bus VB1 and the second video bus VB2.

According to the invention, two video busses are provided in the equipment for through-connection for color television signals. A color television signal which is referred to herein as a video signal comprises the output from one of the video sources is connected to the first video bus. When the video source produces the desired output signals, then an amplifier set for level matching would be the only equipment required. Otherwise, a corresponding recoding in the corresponding source adaption module must occur. The same is true also for connected video sinks which are all connected in common to the second video bus. The connection of the video buses to the broadband network occurs through a switch-over module which also allows the two video buses to be connected to one another. Instead of a complicated switching matrix network, only one switch set and the switch-over components including at the at least three interface switch sets is required per source connection module. Every switch set thus contains a number of switches equal in number to the number of components of the color television signal. The analogous situation applies to the amplifier sets. The particular advantage of the equipment of the invention in addition to the low circuit cost outlay is the great flexibility for connection possibilities between the sources and sinks. In simple language, an arbitrary plurality of sources and sinks of completely different types can be connected. Customer associated modifications can be produced merely by modifying the sink and source connection assemblies.

The system provides that differently coded color television signals can be through-connected with the equipment. Thus, for example, the color television signals can be divided into a luminance signal and two color different signals and can be through-connected in this form.

Most advantageous, however, the use of a color television signal which is divided into components red, green and blue and a synchronizing signal whose signals are already available and are supplied by a multitude of video sources and which can already be supplied to a large number of video sinks. A conversion of this signal RGBS into a luminance and two color different signals YUV produces no problems and requires only a small circuit outlay.

The equipment of the invention also allows text and graphic signals to be mixed in and these can be supplied, for example from a picture screen text source.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
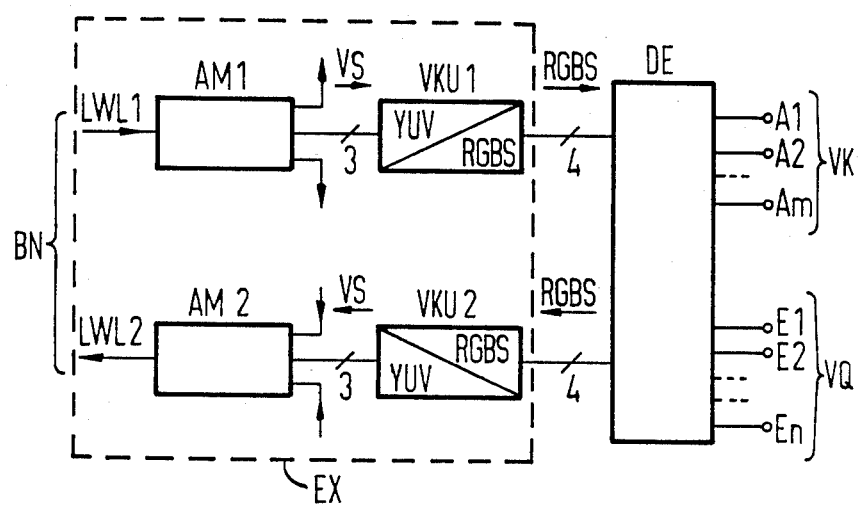
FIG. 1 is a block diagram illustrating the equipment of the invention for through-connection of video signals to a broadband network.

It is assumed in the exemplary embodiments described in this application that red, green, blue and synchronizing signals which are referred to herein as RGBS are available at the video buses. FIG. 1 is a block diagram showing the connection of the equipment for through-connection of color television signals referred to herein as through-connection equipment DE. The through-connection equipment DE is connected to a coder and multiplexer assembly EX (external system) by way of input lines and output lines $L_A$ and $L_E$. The coder and multiplex assembly EX is connected, for example, to the broadband network BN by way of light waveguides LWL1 and LWL2 as shown. The signals received from the broadband network BN by way of the light waveguide LWL1 are supplied to a connection and demultiplexer assembly AM1 forming a part of the coder and multiplexer EX as shown. The video signal VS usually transmitted as a luminance signal and as two color different signals is supplied to a first video signal component converter VKU1 which produces a video signal at its output which contains the desired components, RGBS. The video output signal from the through-connection equipment DE to the coder and multiplexer EX contains the components RGBS which are recoded into a luminance signal and into two color different signals by a second video signal component converter VKU2. The correspondingly coded video signal VS is supplied to the broadband network BN through the second light waveguide LWL2 through a connection and multiplex assembly AM2. A number of input terminals E1 through En to which video sources VQ can be connected are provided at the user side of the through-connection equipment DE. A plurality of output terminals A1 through Am to which video sinks VK are connected are provided at the output of the through-connection equipment DE as illustrated in FIG. 1.

Figure 2:
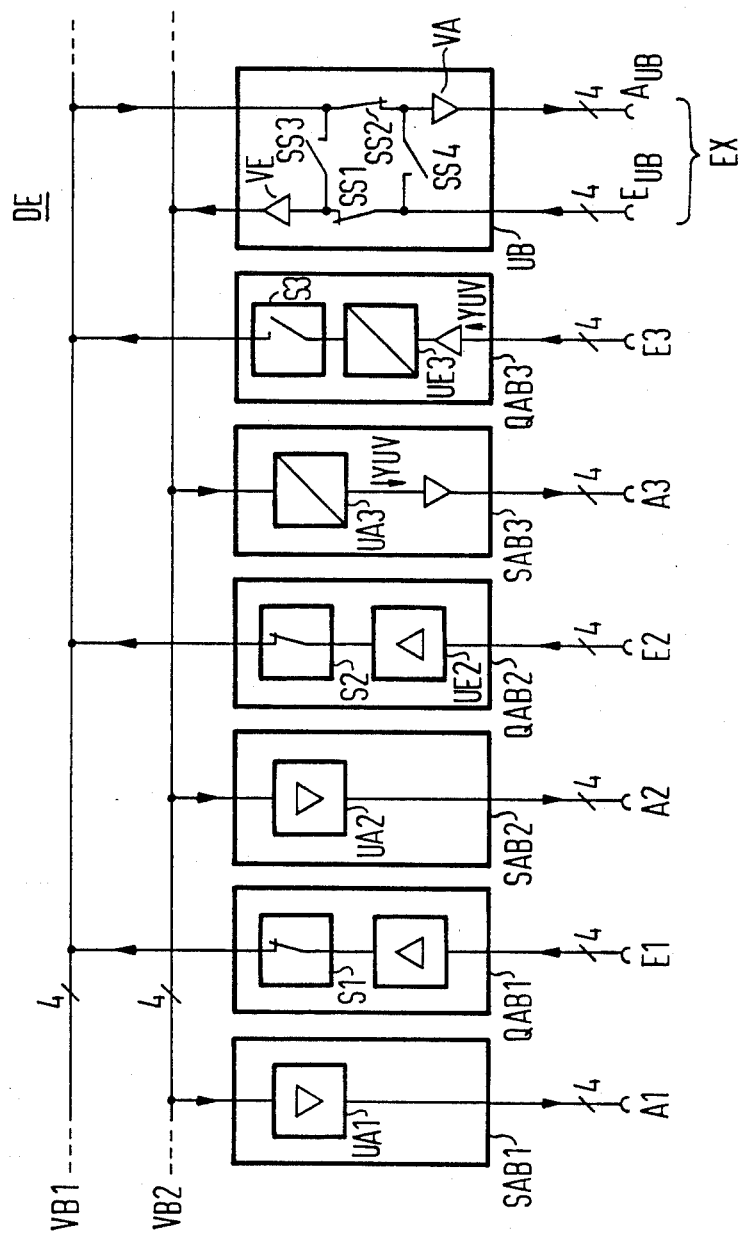
FIG. 2 is an exemplary block diagram of the equipment of the invention for through-connection of color television signals.

FIG. 2 is a detailed view of the through-connection equipment DE and illustrates this equipment in detail. The equipment DE contains a first video bus VB1 to which the required plurality of video sources are connected by way of video connection assemblies QAB1 through QAB3. The equipment also contains a second video bus VB2 to which an arbitrary plurality of video sinks are connected by way of sink connection assemblies SAB1 through SAB3. In the exemplary embodiment, through source connection assemblies QAB1 through QAB3 are connected to a first video bus VB1. Each of these source connection assemblies respectively contain a switch set S1 through S3 by way of which one of the assemblies can be connected to the first video bus VB1. The assemblies QAB1 through QAB3 also respectively contain input signal matching circuits UE1 through UE3 as illustrated which accomplish the correct matching of the video sources to the signals RGBS prescribed to be supplied to the video busses. The source connection assembly may, for example, contain only one amplifier set which provides for level matching as in the input signal matching circuits QAB1 and QAB2. Also, the source connection assembly can also contain an amplifier set for level matching and a video signal component converter UE3 as is contained in the third source connection assembly QAB3.

In this example, the three sink connection assemblies SAB1 through SAB3 are directly connected to the second video bus VB2 and video sinks are connected to the output terminals A1 through A3 of the assemblies SAB1 through SAB3. The sink matching assemblies SAB1 and SAB2 each respectively only contain an amplifier UA1 and UA2 for level matching. The third sink connection assembly SAB3 contains a video signal component converter UA3 and an amplifier for level matching. The conversion of video signals composed of a luminance signal Y and of two color different signals U and V are supplied at the output of the sink connection assembly SAB3. A switch-over assembly UB is connected to the video busses VB1 and VB2 and to the output lines $L_A$ ($A_{UB}$) and to the input lines $L_E$ ($E_{UB}$) of the switch-over assembly UB which are connected to the coder and multiplexer assembly EX as shown in FIG. 1.

A first interface switch set SS1 in the switch-over assembly UB is connected to the bus VB2 through an amplifier VE. The switch SS1 and the amplifier VE are connected between the input lines $L_E$ and the bus VB2. A second interface switch SS2 and an amplifier VA are connected between the first video bus VB1 and the output lines $L_A$. A third interface switch SS3 allows the first and second video busses VB1 and VB2 to be interconnected and a fourth interface switch set SS4 enables the input lines $L_E$ to be connected to the output lines $L_A$ to form a line loop. Depending on the signal level conditions, it is to be realized that a different arrangement of the input amplifier set VE and the output amplifier set VA may be necessary and under certain conditions one or both of the amplifier sets can be omitted.

A respective video source can be connected to the first video bus VB1 by way of the switch sets S1 through S3 and signals can be connected from bus VB1 through the third interface switch set SS3 to the second video bus VB2 so that any arbitrary connection between a particular video source and a particular video sinks of the user is possible. Of course, at least the interface switch set SS1 must be opened during this condition.

It is also possible to connect the input lines $L_E$ to all of the video sinks by way of the first interface switch set SS1. Simultaneously, an arbitrary video source can be connected to the output lines $L_A$ by way of the first video bus VB1 and the second interface switch SS2 so that a full duplex operation is possible by way of the coder and multiplex assembly EX which is connected to the inputs at $E_{UB}$ and to the outputs $A_{UB}$ of the switch-over assembly $U_B$. Also, with open interface switch sets SS1 and SS2 (at least the interface switch set SS2 must be opened), the input lines $L_E$ can be connected to the output lines $L_A$ by way of the fourth interface switch set SS4.

Figure 3:
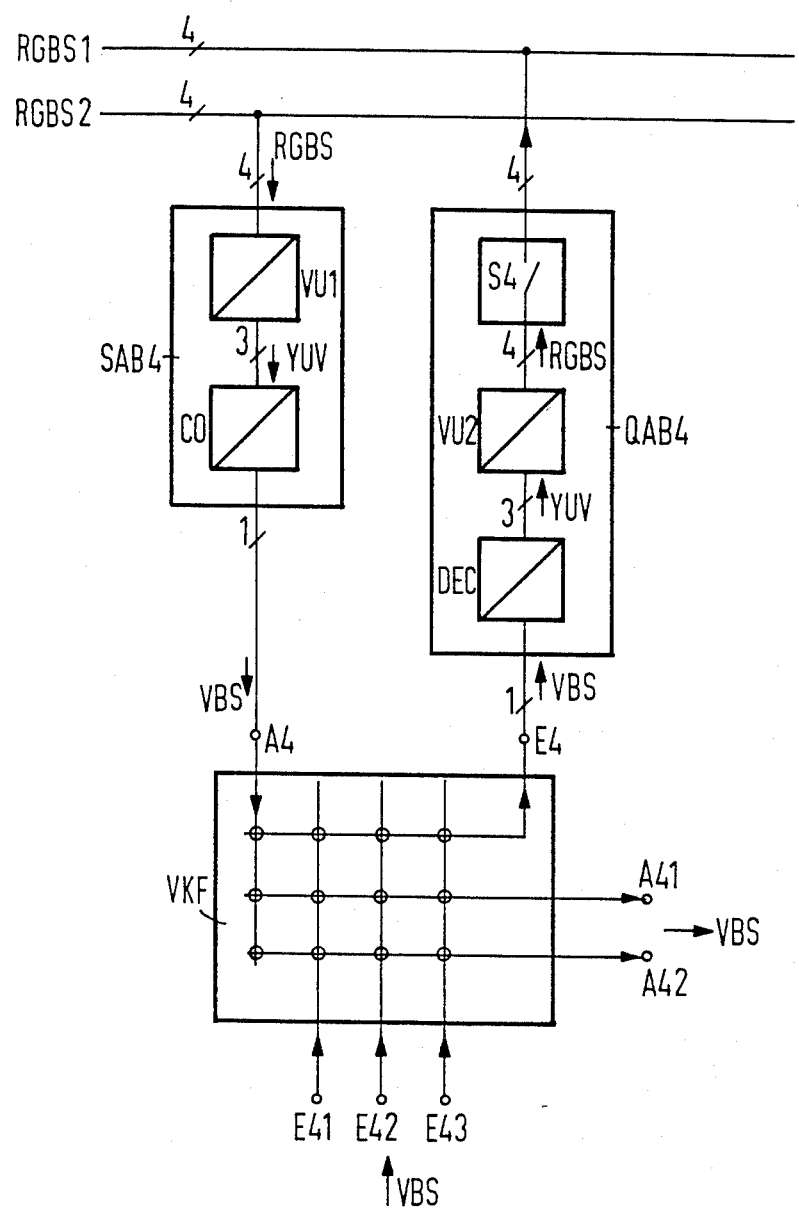
FIG. 3 is a block diagram of a source connection assembly and a sink connection assembly for connecting analog video signals.

FIG. 3 illustrates a fourth source connection assembly QAB4 which is connected to the first video bus VB1 and a fourth sink connection assembly SAB4 which is connected to the second video bus VB2. An analog video base signal VBS which, for example, corresponds to the PAL, NTSC or to the SECAM format is supplied to the input E4 of the fourth source connection assembly QAB4. This video base signal is converted into a RGBS signal in the source connection assembly QAB4. This occurs in two steps wherein first the video base signal VBS is supplied to a decoder DEC and is converted into a luminance signal Y and into two color different signals U and V. A RGBS signal is generated therefrom in a video component converter VU2 (often referred to as a matrix). It is also possible, of course, to use a corresponding decoder as, for example, a PAL decoder which produces a RGBS signal.

In the four sink connection assembly SAB4, the RGBS signal is first supplied to a video component converter VU1 where it is converted into a luminance signal Y and into two color different signals U, V and is then supplied to a coder, for example, a PAL coder which again generates a video base signal VBS.

Of course, a plurality of these connection assemblies can be connected to every video bus VB. Since coders and decoders are used, a preswitching network VKF is expediently provided which produces the output at terminal E4 and receives an input at terminal A4. Respective video sources can be connected to the inputs E41 through E43 and respective video sinks can be connected to the outputs A41 and A42. The circles at the crossing points of the lines connected to the input and output terminals can be selectively connected in a matrix network so as to properly connect the signals as is known in the prior art.

Figure 4:
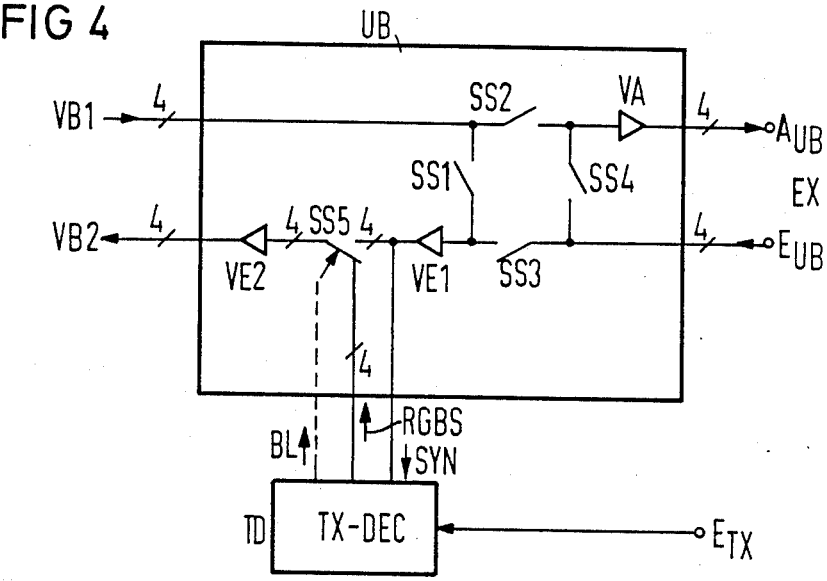
FIG. 4 is a detail view of an expanded switch-over assembly for mixing text or graphic signals of a text decoder.

FIG. 4 illustrates an expanded switch assembly UB. This structure contains a blanking switch over a set SS5 which follows the third interface switch SS3 between the input $E_{UB}$ and the second video bus VB2 and it is also arranged between two input amplifier sets VE1 and VE2. The blanking switch overset SS5 is selectively connectible to the third interface switch-over set SS3 or, respectively, to the first interface switch set SS1 or to the text output of a text decoder TD. The text decoder TD which receives its information by way of a text input $E_{TX}$ is supplied with a synchronizing signal SYN proceeding from the output of the first input amplifier VE1 so as to achieve matching to the video signal which has been through-connected to the second video bus VB2.

The text decoder outputs a blanking control signal BL by way of a control line which always connects the blanking switch over set SS5 to the text output of the text decoder when a letter or message or a part of a letter is to be mixed into the video signal. In the current state of the art a picture screen text decoder which also produces outputs which are RGBS signals may be used as a text decoder. It is to be realized that the interfaces between the text decoder and the expanded switch-over assembly $U_B$ must be matched to each other functionally and electrically.

Figure 5:
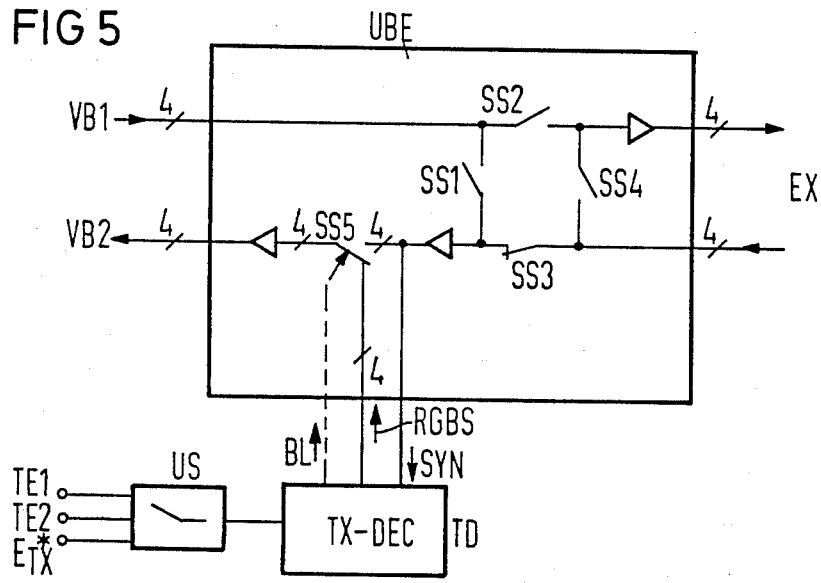
FIG. 5 is an expanded switch-over assembly illustrating a switch-over means before the text decoder.

FIG. 5 illustrates an arrangement where the text input $E_{TX}$ of the text decoder is proceeded by a switch-over set US which receives three inputs TE1, TE2 and $E_{TX}$. By way of the switch-over set, the text decoder TD can also be connected to further text or video sources, for example, by connection to the outputs A41, A42 of the pre-switching matrix network VKF illustrated in FIG. 3 such that the possibility of text mixing, picture and picture are further expanded.

In all of the FIGS., the number of connecting lines amplifiers and switches is identified by specifying a number at the connecting lines.

In order to prevent faulty operation, for example, the simultaneous connection of a plurality of video sources to the first video bus VB1, it is expedient that the actuation of the switches occurs by way of a processor which executes the necessary checks and only allows desired through-connections in the system.

Although the invention has been described with respect to preferred embodiments, it is not to be so limited as changes and modifications can be made which are within the full intended scope of the invention as defined by the appended claims.

We claim as our invention:

1. Equipment for through-connecting color television signals between a broadband network (BN) and video sources (VQ) and video sinks (VK) which are connected thereto, comprising a first video bus (VB1), a plurality of switch sets (S1 through S3) connected to said first video bus (VB1), a plurality of source connection assemblies (QAB1 through QAB3) connectible to said first video bus by said switch sets (S1 through S3), a second video bus (VB2), a plurality of sink connection assemblies (SAB1 through SAB3) connected to said second video bus, a switch-over-assembly (UB) with its input lines ($L_E$) and output lines ($L_A$) connected to said broadband network (BN), interface switch sets (SS1, SS2 and SS3), said switch-over assembly connectible to said video buses (VB1, VB2) by said interface switch sets (SS1, SS2, SS3), a first one (SS1) of said interface switch sets connected between said input lines ($L_E$) and said second video bus (VB2), a second one (SS2) of said interface switch sets connected between said first video bus (VB1) and said output lines, and a third one (SS3) of said interface switch sets connected between said first video bus (VB1) and said second video bus (VB2).

2. Equipment according to claim 1, wherein said switch-over assembly (UB) contains a fourth interface switch set (SS4) which is connected between said input lines ($L_E$) and said output lines ($L_A$).

3. Equipment according to claim 1 or claim 2, wherein said source connection assemblies (QAB1 through QAB3) and said sink connection assemblies (SAB1 through SAB3) contain amplifiers (UE1, UA1) and/or video component converters (UE3, UA3) for an input signal matching circuit (UE) or, respectively, an output signal matching circuit (UA).

4. Equipment according to claim 1 wherein source connection assemblies (QA4) and/or sink connection assemblies (SA4) are provided which respectively convert an analog video base signal (VBS) into color and sync components (RGBS) of a video signal or, respectively, convert a video signal which is divided into color and sink components (RGBS) into an analog video base signal (VBS).

5. Equipment according to claim 4 wherein one input (E4) of said source connection assembly (QA4) and an output (A4) of said sink connection assembly (SA4) is preceded by a pre-switching matrix network (VKF) which has a plurality of inputs (E41, E42, E43) and a plurality of outputs (A41, A42) that can be interconnected.

6. Equipment according to claim 1 wherein red, green, blue and synchronizing signals (RGBS) are processed on said first and second video buses (VB1, VB2).

7. Equipment according to claim 4 comprising a text decoder, an expanded switch-over assembly (UB) is provided which comprises a blanking switch-over set (SS5) in series with said third interface switch set (SS3) between said input lines ($L_E$) and said second video bus (VB2), and said blanking switch-over set being switched over for mixing text and graphics signals in at the output of said text decoder (TD).

8. Equipment according to claim 7, wherein a switch-over set (US) comprising at least two inputs precedes a text input ($E_{TX}$) of said text decoder (TD).

* * * * *